United States Patent
Diehl et al.

(10) Patent No.: US 6,991,525 B2
(45) Date of Patent: Jan. 31, 2006

(54) METHOD AND DEVICE FOR THE SURFACE MACHINING OF WORKPIECES COMPOSED OF NON-BRITTLE MATERIALS IN OPTICAL LENS MANUFACTURING AND TOOL FOR THIS PURPOSE

(75) Inventors: Joachim Diehl, Giessen-Allendorf (DE); Ronald Lautz, Hüttenberg (DE); Karl-Heinz Tross, Ehringshausen (DE)

(73) Assignee: Loh Optikmaschinen AG, Wetzler (DE)

( * ) Notice: Subject to any disclaimer, the term of this patent is extended or adjusted under 35 U.S.C. 154(b) by 297 days.

(21) Appl. No.: 10/231,862

(22) Filed: Aug. 30, 2002

(65) Prior Publication Data
US 2003/0043343 A1 Mar. 6, 2003

(30) Foreign Application Priority Data
Sep. 6, 2001 (DE) ................ 101 43 848

(51) Int. Cl.
*B24B 13/00* (2006.01)
(52) U.S. Cl. ................ 451/65; 451/461; 407/53
(58) Field of Classification Search ............... 451/65, 451/42, 461, 548; 407/53, 40, 42, 34
See application file for complete search history.

(56) References Cited

U.S. PATENT DOCUMENTS

| | | | |
|---|---|---|---|
| 2,814,854 A * | 12/1957 | Murray | 407/41 |
| 3,692,370 A | 9/1972 | Hasz | |
| 3,733,265 A * | 5/1973 | Spriggs | 210/667 |
| 3,831,236 A * | 8/1974 | Coburn et al. | 407/53 |
| 4,016,682 A | 4/1977 | Legendre | |
| 4,333,368 A | 6/1982 | Watt | |
| 4,743,144 A * | 5/1988 | Shikata | 407/42 |
| 5,092,083 A * | 3/1992 | Raffaelli | 451/541 |
| 5,168,661 A | 12/1992 | Pedersen et al. | |

(Continued)

FOREIGN PATENT DOCUMENTS

DE 195 25 310 A1 12/1995

(Continued)

OTHER PUBLICATIONS

Durbin, Charles E. and Martin W. Burnham, SPIF vol. 93 Advances in Precision Machining of Optics (1976), p. 32-37.

*Primary Examiner*—Robert A. Rose
(74) *Attorney, Agent, or Firm*—McAndrews Held & Malloy Ltd.

(57) ABSTRACT

A device is disclosed for the surface machining of, among other things, plastic spectacle lenses, which has a work spindle, by means of which the spectacle lens can be driven with a controlled angle of rotation about an axis of work rotation, and a tool spindle, by means of which a tool can be driven to rotate about an axis of tool rotation, work and tool spindle being movable relative to one another with their positions controlled in two axes running at right angles. For rotational machining of the surface of the spectacle lens to be machined, the tool can also be swiveled by means of the tool spindle with a controlled angle of rotation about the axis of tool rotation, so that a rotational cutting edge provided on the tool can be brought into a defined rotational machining engagement with the surface of the spectacle lens to be machined as a function of the angle of rotation of the spectacle lens. Also included is a combined milling and rotational machining tool and a combined milling and rotational machining method. As a result, high cutting rates and very good surface qualities can be easily and efficiently achieved in the surface machining.

12 Claims, 4 Drawing Sheets

U.S. PATENT DOCUMENTS

| | | |
|---|---|---|
| 5,185,965 A | 2/1993 | Ozaki |
| 5,195,407 A | 3/1993 | Takeno et al. |
| 5,359,814 A | 11/1994 | Baltazar et al. |
| 5,367,835 A | 11/1994 | Turnbull |
| 5,402,607 A | 4/1995 | Lombard |
| 5,417,130 A | 5/1995 | Dorsch |
| 5,485,771 A | 1/1996 | Brennan et al. |
| 5,938,381 A | 8/1999 | Diehl |
| 6,227,952 B1 | 5/2001 | Diehl et al. |
| 6,237,452 B1 | 5/2001 | Ludwick et al. |

FOREIGN PATENT DOCUMENTS

| | | | |
|---|---|---|---|
| EP | 0 521 598 A1 | 7/1993 | |
| EP | 0 786 309 A1 | 7/1997 | |
| EP | 0 849 038 A2 | 6/1998 | |
| JP | 0022183 * | 2/1977 | .......... 407/40 |
| WO | WO 97/13603 | 4/1997 | |
| WO | WO 99/33611 | 7/1999 | |

* cited by examiner

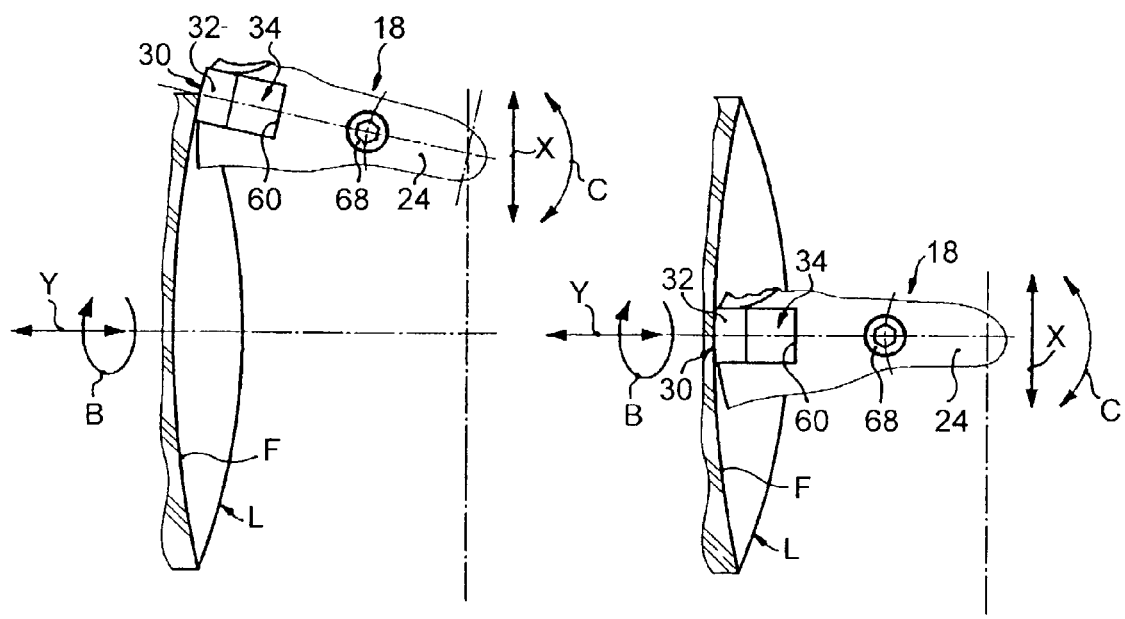
FIG. 8   FIG. 10
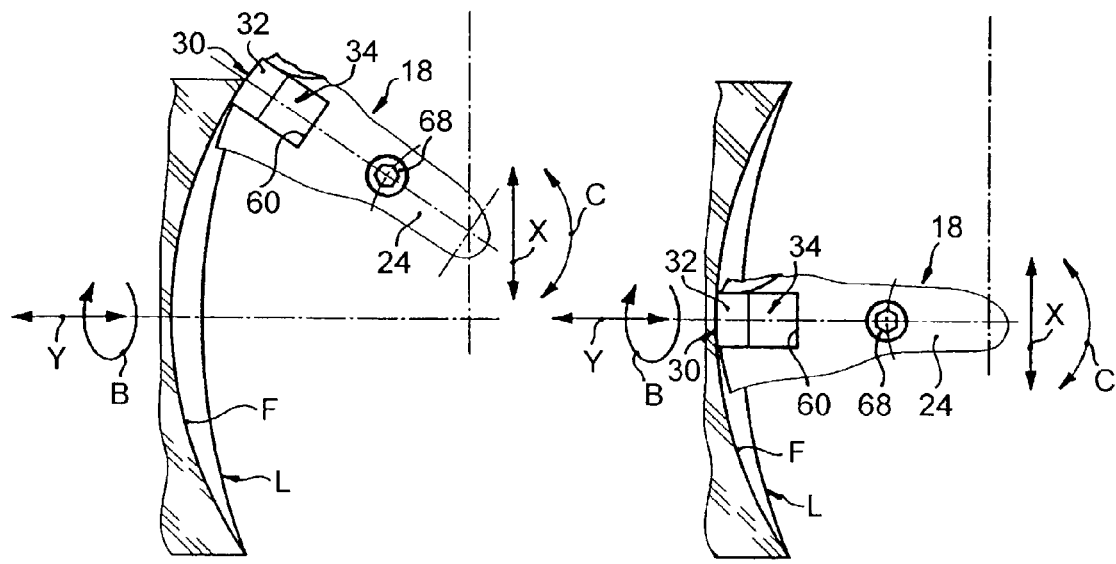
FIG. 9   FIG. 11

METHOD AND DEVICE FOR THE SURFACE MACHINING OF WORKPIECES COMPOSED OF NON-BRITTLE MATERIALS IN OPTICAL LENS MANUFACTURING AND TOOL FOR THIS PURPOSE

BACKGROUND OF THE INVENTION

The present invention relates to a method and a device for the surface machining of workpieces composed of non-brittle materials in optical lens manufacturing, and to a tool for this purpose. The invention relates in particular to the industrial machining of prescription surfaces of spectacle lenses composed of plastics such as polycarbonate, CR39 and so-called "high index" materials.

This machining is usually performed on an injection molded plastic spectacle lens "blank", which has a standardised, finished convex outer surface with, for example, a spherical or progressive shape. Machining gives the generally concave inner or prescription surfaces a spherical, aspherical, toroidal, atoroidal, progressive or freeform geometry, depending on the desired optical effect. After blocking the spectacle lens blank with its outer surface on a blocking piece, the typical, conventional sequence in machining of the inner surface provides for a milling or rotational machining process for producing the optically active shape, followed by a fining or polishing process in order to obtain the necessary surface quality.

DESCRIPTION OF THE PRIOR ART

In this context, the generic prior art according to DE 195 29 786 C1 filed by the applicant has disclosed a method of producing a surface on a spectacle lens blank, which is suitable both for brittle materials and for plastics. In this method, a disc-shaped, rotationally symmetrical grinding or milling tool of relatively large diameter is used, by means of which, in at least two operations, an infeed grinding operation for the main material abrasion and a shaping operation with further material abrasion along a helical path, the blank material to be removed is cut at a high grinding or milling rate. The latter operation results in a machining path running spirally inwards, with low kinematic roughness for a relatively large spiral interval. The surface thus produced then requires little fining and polishing. Both an edging operation designed to conform to the spectacle frame shape and a spectacle glass edge beveling operation can even be integrated into this method as an option.

Although a very good cutting rate and consequently short machining times that meet industrial requirements can be obtained with this known method, it would be desirable, in certain applications, to obtain an even better surface quality prior to the fining and polishing, particularly in the case of complex optical surfaces, such as aspherical, atoroidal or progressive and freeform surfaces. With these surface forms, it is in fact not possible to follow on with any fining processes that use fixed-shape tools. Instead, such surfaces generally have to be polished using flexible polishing tools, this operation being all the more successful and efficient the less polishing abrasion is necessary. It might ideally even be possible to dispense with any fining and polishing altogether in the case of surfaces having a very high surface quality, an optical quality akin to polishing possibly being achievable by means of a subsequent coating process, also referred to as "cut and coat" (see DE 30 17 880 A1, for example).

Finally, as already mentioned initially, rotational machining methods are known, which serve for producing prescription surfaces on plastic spectacle lens blanks. Reference is made in this context to the publications U.S. Pat. No. 5,485,771, WO 97/13603, EP 0 849 038 A2 and WO 99/33611, for example. With these rotational machining methods, adequate cutting speeds are necessary in order to obtain high-quality surfaces. If non-rotationally symmetrical surfaces with high cylindrical effects are being turned, for example, the turning tool must be moved with enormously high rates of acceleration of sometimes more than 10 g over a travel of up to 15 mm twice per workpiece revolution and with great positional accuracy in order to obtain high surface qualities. In the relevant prior art, so-called "fast tool servos", in which the turning tool is moved directly by means of a linear motor, are used for this purpose. In order to compensate for the resulting oscillation of the turning support, a compensating carriage of corresponding weight to the turning support is provided, which oscillates in phase opposition to the turning support. The moving parts in this must be of extremely lightweight construction, especially since the high accelerations place great technical demands on the linear motors, the measuring systems and not least on the control. Furthermore, it is not possible to cut blank material more than 5 mm thick, even using profile turning tools. Spectacle lens blanks, however, are often up to 15 mm thicker than the finished spectacle lens, so that multiple rotational machining operations are necessary. All in all, the known rotational machining methods use relatively expensive devices, and there is a need for improvement in the machining times where large volumes of material have to be cut.

SUMMARY OF THE INVENTION

Proceeding from the prior art according to DE 195 29 786 C1, the object of the invention is to specify an efficient method and to create a device of simple construction, by means of which a surface quality superior to the generic prior art can be achieved at a high cutting rate. The object of the invention also encompasses the provision of a tool of suitable design.

According to a basic idea of the invention, in a method for the surface machining of workpieces composed of non-brittle materials in optical lens manufacturing, such as plastic spectacles, in which the workpiece rotating with a controlled angle of rotation about an axis of work rotation B is subjected to a milling operation by a tool, which rotates about an axis of tool rotation C enclosing a predetermined angle α with the axis of work rotation B, the workpiece and the tool being movable relative to one another with their positions controlled in at least one of two axes X, Y running at right angles, in such a way that the tool during an infeed machining or grinding operation produces an annular trough-shaped recess at least in the area of the outer edge of the workpiece, before the tool in a shaping operation abrades further material along a helical path over the workpiece, the milling operation is followed by a rotational or turning machining operation, in which a rotational cutting edge provided on the tool is applied, by a positionally controlled relative movement of workpiece and tool in at least one of the two axes X and Y and by a swivel movement of the tool with a controlled angle of rotation about the axis of tool rotation C, tangentially to the surface to be machined on the workpiece that is being turned with a controlled angle of rotation about the axis of work rotation B, and, in the rotational machining engagement, is guided along a helical path over the workpiece.

Particularly for performing the above-mentioned method, the invention includes a tool for the surface machining of workpieces composed of non-brittle material in optical lens manufacturing, such as plastic spectacle lenses, which has a body on which a plurality of milling cutter edges are provided, which as the tool rotates about an axis of tool rotation C define a circular orbit in a plane perpendicular to the axis of tool rotation C, the tool having at least one rotational cutting edge on the body, which is offset radially inwards by a predefined amount in relation to the circular orbit of the milling cutter edges.

Finally, in the device of the invention, for the surface machining of workpieces composed of non-brittle materials in optical lens manufacturing, such as plastic spectacle lenses, which is particularly suited for implementation of the above-mentioned method, using the above-mentioned tool in particular, the device has a work spindle, by means of which the workpiece can be driven to rotate with a controlled angle of rotation about an axis of work rotation B, and a tool spindle, by means of which the tool can be driven to rotate about an axis of tool rotation C, which encloses a predetermined angle with the axis of work rotation B, work and tool spindles being movable relative to one another with their positions controlled in two axes X, Y running at right angles; according to the invention the tool can be swiveled by means of the tool spindle with a controlled angle of rotation about the axis of tool rotation C for a rotational machining of the surface of the workpiece to be machined, so that a rotational cutting edge provided on the tool can be brought into a defined rotational machining engagement with the surface of the workpiece to be machined as a function of the angle of rotation of the workpiece.

In terms of the method, therefore, the invention essentially aims to combine the proven milling operation, in which large amounts of the workpiece material, such as the spectacle lens blank, can be cut in a very short time, with an ensuing, special (fine) rotational machining operation, which serves to obtain a superior surface quality. The rotational machining operation and any subsequent machining stages remove unwanted milling scores, which are produced during the milling operation owing to the discontinuous machining engagement of the individual milling cutter edges or the interrupted cutting by the milling cutter edges on the machined surface of the workpiece towards the central axis essentially perpendicular to the helical path. In terms of tooling, a tool is proposed, which virtually represents a combination of milling cutter and rotational cutting edge or tool turret, at least one rotational cutting edge of the tool being situated radially behind the circular orbit of the milling cutter edges, so that the rotational cutting edge cannot come into machining engagement with the workpiece whilst the tool is continuously rotating during a milling operation. For a rotational machining operation following the milling operation, the tool must first be stopped and its rotational cutting edge then positioned angularly in relation to the workpiece surface to be machined. With regard to the cutting edge geometry (cutting edge radius, rake angle) and the cutting edge material, therefore, the rotational cutting edge can be designed independently from the milling cutter edges, and in consequence can be optimally suited to the workpiece material. Finally, in terms of the device, the known device positionally controlled in the two linear axes X and Y and with a controlled angle of rotation in the axis of work rotation B can easily be supplemented by a further (CNC) axis, that is the axis of tool rotation C with a controlled angle of rotation. This permits swivel positioning of the tool in relation to the surface of the workpiece to be machined, so that the rotational cutting edge of the tool can always be brought into a defined rotational machining engagement with the surface of the workpiece to be machined, in such a way, for example, that a tangent applied to the rotational cutting edge always coincides with a tangent applied to the surface to be machined. The upshot is that the surface of the workpiece to be machined can be subjected in just one device and one set-up of the workpiece both to a milling operation, with a relatively large cutting volume, and to a (fine) rotational machining operation, using only one tool, which in addition to milling cutter edges also has at least one rotational cutting edge, so that surfaces of any geometry can be rapidly and reliably machined with high quality, that is to say with improved geometric accuracy in their macro-geometry and minimal edge zone damage in their micro-geometry.

It is also proposed that in the rotational machining operation at least one area of a rotational cutting edge of the tool be brought into rotational machining engagement with the surface of the workpiece to be machined, at least that area of the rotational cutting edge brought into rotational machining engagement being equally or only slightly more curved than the surface to be machined. Since according to the invention the rotational cutting edge can also be swiveled to a defined extent and hence applied tangentially to the surface of the workpiece to be machined, even a relatively narrow rotational cutting edge may here cost effectively have a relatively shallow curvature or a large radius, unlike the rotational cutting edges used in the prior art, which must have a very pronounced curvature or a very small radius, in order that they can produce a defined geometry on the workpiece, especially spectacle lenses having strongly curved prescription surfaces, using only a linear infeed. The use of rotational cutting edges with comparatively shallow curvatures, rendered feasible and cost-effective for the first time by the invention, also has the advantage that in rotational machining helical paths can be followed with relatively large spiral intervals without highly dynamic infeed movements, which not only speeds up the rotational machining compared to conventional rotational machining processes for at least equal quality of the surfaces produced, but also places less heavy demands on the device used.

The method in the rotational machining operation also advantageously builds on the fact that the rotational cutting edge according to the invention can be swiveled to a defined extent in relation to the surface of the workpiece to be machined. Accordingly, in the rotational machining operation at least one area of a rotational cutting edge of the tool is brought into rotational machining engagement with the surface of the workpiece to be machined, the tool for further rotational machining operations being swiveled with a controlled angle of rotation about the axis of tool rotation as a function of the wear of the rotational cutting edge, in order to bring another area of this rotational cutting edge or at least an area of another rotational cutting edge into rotational machining engagement with the surface of the workpiece to be machined. Here the rotational cutting edge wear could be determined, for example, via a measurement of the surface produced and a subsequent comparison between the desired condition and the actual condition of the machining result.

For the rotational machining operation a rotational cutting edge may be used on the tool which may have differently curved areas, the tool being swiveled with a controlled angle of rotation about the axis of tool rotation as a function of the desired cutting volume and the desired surface quality of the surface of the workpiece to be machined, in such a way that for a comparatively large cutting volume a more heavily curved area of the rotational cutting edge is brought into rotational machining engagement with the surface of the workpiece to be machined, whereas for a comparatively high surface quality a less heavily curved area of the rotational cutting edge is brought into rotational machining engagement with the surface of the workpiece to be machined. Thus the rotational machining can be performed according to advantageously pre-selectable criteria in accordance with the particular requirements, without having to change the tool. The design of the tool may be such that the rotational cutting edge has areas of different, in each case constant curvature, this being particularly suitable from the technical manufacturing standpoint, the curvature diminishing continuously area by area from one end of the rotational cutting edge to the other end of the rotational cutting edge in the direction of rotation of the tool.

In the rotational machining operation, a rotational cutting edge in rotational machining engagement with the surface to be machined may be guided over the workpiece along a helical path having a shape similar to an Archimedean spiral, which is simple from a control engineering standpoint. This also advantageously allows essentially constant cutting speeds during the rotational machining operation, without having to incur a high control engineering cost for this purpose. Alternatively, it is also conceivable during the rotational machining operation, however, to follow helical paths, which have a compressed shape in one of the axes X, Y. A compression of the shape of the helical path in that axial direction, in which the components of the device involved have to be moved with or against the force of gravity during the rotational machining operation would be one possible way of reducing the dynamics of the infeed movements.

Another advantage of the method, combining a specific milling operation and a following special rotational machining operation, is that the problem, familiar from pure turning methods, of the formation of a continuous chip and hence of chip disposal does not exist, which is not to be underestimated, especially in the case of tough plastics, such as polycarbonate. In unattended, fully automated machining, in particular, a continuous chip can lead to chip clogging and resulting machine stoppages. For this reason, a chip suction removal device with integral chopper is often used in the case of spectacle lens turning machines. Such devices are unnecessary in the present machining method, which represents an advantage. During the initial milling operation, short chips are produced, the removal of which presents no problems; in the subsequent rotational machining operation a very thin, relatively wide continuous chip is produced, not least owing to the only very slightly curved rotational cutting edge that is possible as described above, this chip being locally weakened owing to the milling scores also abraded, which virtually constitute predetermined breaking points in the chip, and therefore makes breaking up relatively easy. As tests by the applicant have shown, the continuous chip produced in the rotational machining operation are especially easy to fragment, when a high-pressure coolant jet is directed at the point of machining engagement between tool and workpiece during the rotational machining operation.

A plurality of rotational cutting edges may be provided on the body, which are preferably distributed uniformly over the circumference of the body. For example, different rotational cutting edges which in respect of their geometry and/or the rotational cutting edge material are individually adapted to the workpiece geometry to be produced and/or to the workpiece material to be cut, and can therefore be advantageously used on one tool, so that there is no need to change the tool even for the machining of workpieces of differing geometry or material. A uniform distribution of the rotational cutting edges over the circumference of the body has the advantage that the rotational cutting edges do not give rise to imbalances, which might detract from the surface quality of the finished surface where the tool is used as milling cutter.

The at least one rotational cutting edge has a constant curvature with a radius that is essentially equal to the distance of the rotational cutting edge from the axis of tool rotation C. In an advantageously simple way, this development of the rotational cutting edge reliably prevents shape defects in the machined surface of the workpiece, which might be caused by an incorrect angular position of the rotational cutting edge. That is to say it affords the advantage that any errors in the swivel positioning of the rotational cutting edge in rotational machining are therefore negligible.

The rotational cutting edge may have two areas, one of which has a constant curvature with a radius essentially equal to the distance of the rotational cutting edge from the axis of tool rotation, thereby affording the aforementioned advantages in rotational machining, whilst the other area has a constant curvature with a radius that is distinctly smaller than the radius of the former area. In this development of the rotational cutting edge, that area having a smaller radius can advantageously serve as starting area for the rough machining of the kinematic roughness of the machined workpiece surface still present after the milling operation, whilst the area having the larger radius can be used as geometry-defining area for the smoothing during the rotational machining operation.

The rotational cutting edge may appropriately be formed by a cutting tip on a turning tool, which is detachably fixed to the body, so that the turning tool is exchangeable for the replacement of another turning tool or for dressing or finishing work.

In an advantageously simple development of the tool, the body is provided with a blind hole for receiving a circular shank of the turning tool, the shank having an inclined recess, against which a screw that can be screwed into a tapped hole in the body bears in order to detachably fix the turning tool to the body and to hold it up against a base of the blind hole. The longitudinal adjustment of the turning tool can here be readily performed in the machining device, once the turning tool has been positioned according to the workpiece. To do this, a spectacle lens is turned, for example, and its centre thickness then measured. If the correct centre thickness is not achieved, the extent to which the turning tool was too long or too short for the rotational machining can be compensated for in subsequent machining through corresponding CNC control of the axes of the device.

Finally, both the work spindle and the tool spindle may be aligned horizontally. This arrangement is preferred, because it facilitates loading of the device and chip removal during the machining. Also feasible, however, is an alignment of work and tool spindles optimised in terms of the mass dynamics, in such a way that when machining it is not necessary to move any of the spindles with or against the force of gravity.

BRIEF DESCRIPTION OF THE DRAWINGS

The invention will be explained in more detail below on the basis of preferred examples of embodiment and with reference to the accompanying drawings, some of which are in diagrammatic form, and in which:

FIGS. 8 to 11 show basic, schematic representations, which illustrate a rotational machining operation for the machining of a toroidal surface on a spectacle lens, shown in section, by means of a device according to the invention, using a tool according to the invention, in a top view according to the representation in FIG. 1, FIGS. 8 and 9 representing the beginning and FIGS. 10 and 11 the end of the rotational machining operation, and the spectacle lens being turned 90° further about the axis of work rotation B in FIGS. 9 and 11 than in FIGS. 8 and 10.

DESCRIPTION OF THE PREFERRED EMBODIMENTS

Figure 1:
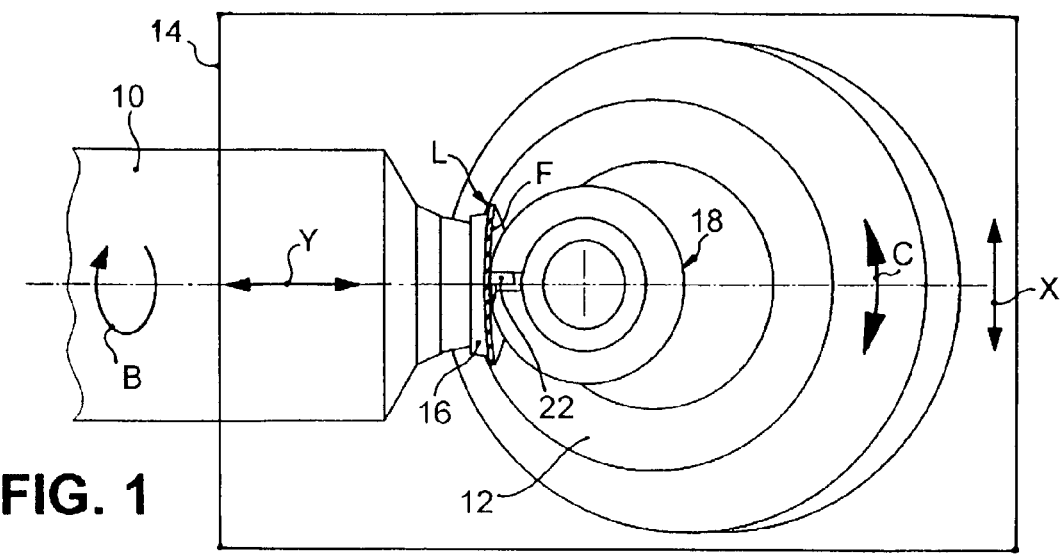
FIG. 1 shows a device according to the invention for the surface machining of plastic spectacle lenses in a diagrammatic, partially sectional and truncated front view, in which workpiece and tool are in milling engagement and four CNC axes are indicated, that is one linear axis Y for the workpiece, a linear axis X running at right-angles thereto for the tool, an axis of work rotation B with a controlled angle of rotation, and an axis of tool rotation C with a controlled angle of rotation.
Figure 2:
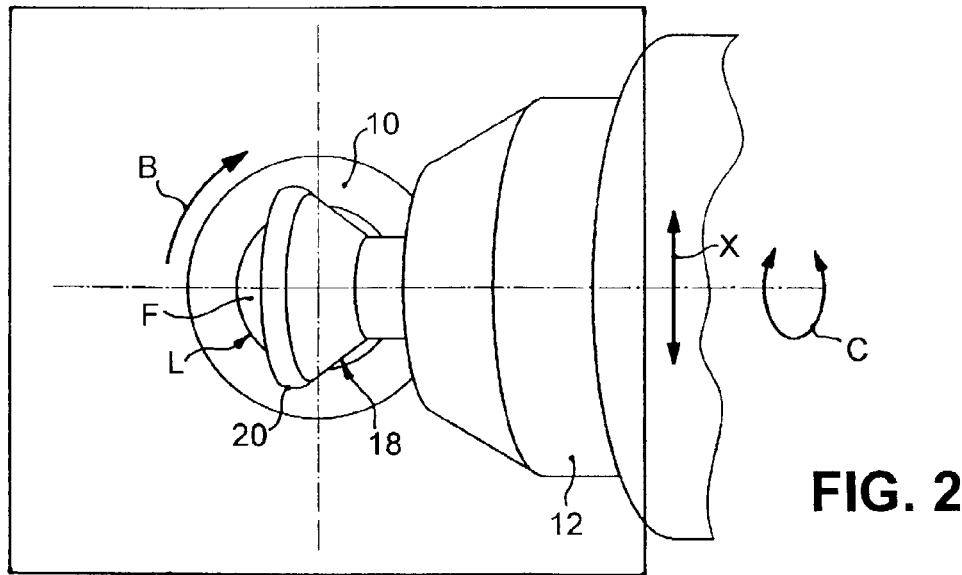
FIG. 2 shows a diagrammatic, truncated side view of the device represented in FIG. 1, viewed from the right in FIG. 1.
Figure 3:
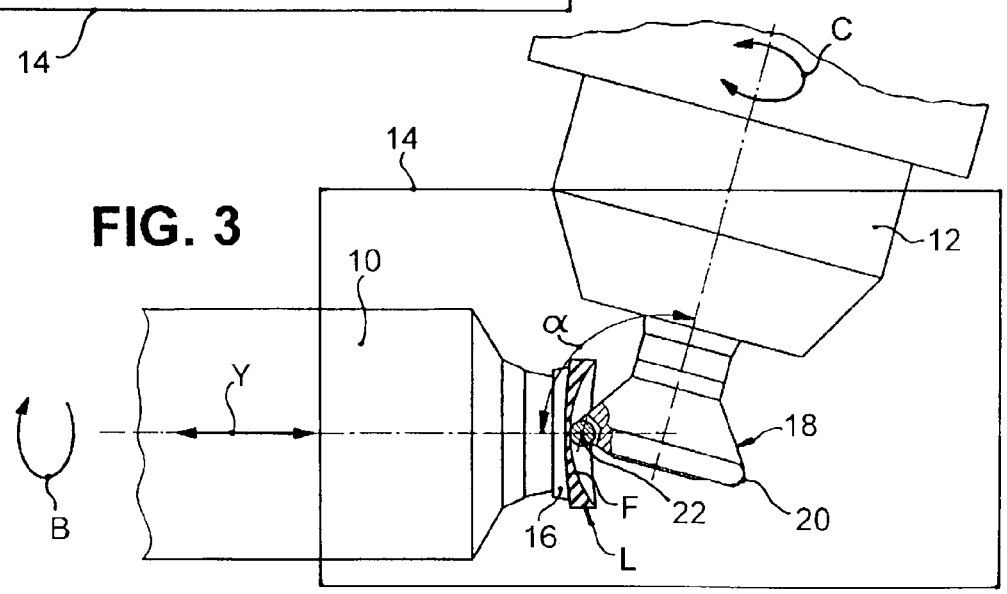
FIG. 3 shows a diagrammatic, partially sectional and truncated top view of the device represented in FIG. 1, viewed from above in FIG. 1.

For the sake of simplicity, in FIGS. 1 to 3 only the work spindle 10 and the tool spindle 12 of the device for surface machining of plastic spectacle lenses L are represented, these spindles extending, suitably sealed off, into a working space 14 that can be shielded from the surroundings and is indicated by the solid lines of a rectangle. For machining of the prescription surface F, the spectacle lens L, blocked on a blocking piece 16, is mounted on the end of the work spindle 10 in a manner known in the art, in such a way that it can rotate coaxially with the work spindle 10. For this purpose the work spindle 10 can be driven to rotate about the axis of work rotation B, with the speed and the angle of rotation controlled by CNC, by means of an electric motor (not shown). Furthermore, the work spindle 10 can be adjusted, positionally controlled by CNC, by means of a carriage (likewise not shown) and assigned drive and control elements, in the linear axis Y, which in the example of embodiment shown runs horizontally, that is to say it can be displaced to a defined extent to the right and to the left in FIGS. 1 and 3.

As shown in FIG. 3, the tool spindle 12, which in the example of embodiment shown is aligned horizontally like the work spindle 10, encloses an angle α, here of 105°, which is predefined or fixed by the machine construction, with the work spindle 10. Fixed to the end of the tool spindle 12 in a manner known in the art is a tool 18, which can rotate coaxially with the tool spindle 12 and which—as will be described in yet more detail below—is specially designed in order to perform both a milling and a rotational machining operation. For this purpose, the tool spindle 12 can be driven to rotate and/or swivel about the axis of tool rotation C by means of an electric motor (not shown), its position and also its angle of rotation controlled by CNC. The rotational drive for the tool spindle is at the same time designed so that, on the one hand, it will permit the speeds of up to 30,000 rpm necessary in order to achieve high cutting rates during a milling operation, and so that, on the other, it will allow highly dynamic positioning of the tool into a precise angular position relative to the prescription surface F of the spectacle lens L to be machined during a rotational machining operation.

The tool spindle 12 can furthermore be adjusted, positionally controlled by CNC, by means of a carriage (likewise not shown) and assigned drive and control elements, in the linear axis X, which in the example of embodiment shown runs vertically, that is to say it can be moved to a defined extent upwards and downwards in FIGS. 1 and 2. Consequently, by means of the device described, the spectacle lens L and the tool 18 can be moved and/or swiveled relative to one another, being positionally controlled in the two linear axes Y and X running at right angles, and having a controlled angle of rotation in the axis of work rotation B and the axis of tool rotation C, in order to bring the tool 18 into a defined machining engagement with the spectacle lens L, and to guide it along a predefinable machining path or a predefinable path relative to the spectacle lens L whilst maintaining the defined machining engagement, as will be explained in more detail below.

Finally it should also be mentioned in this context that an adjustment facility (not shown here) is also provided on the tool spindle 12, which allows the tool spindle 12 to move in a linear direction perpendicular to the axes X and Y, that is to the left or to the right in FIG. 2 and upwards or downwards in FIG. 3, in order, for example, to adjust the circular orbit 20 of milling cutter tips 22 provided on the tool 18, which determines the geometry of the surface F to be machined during a milling operation, in relation to the axis of work rotation B.

Figure 4:
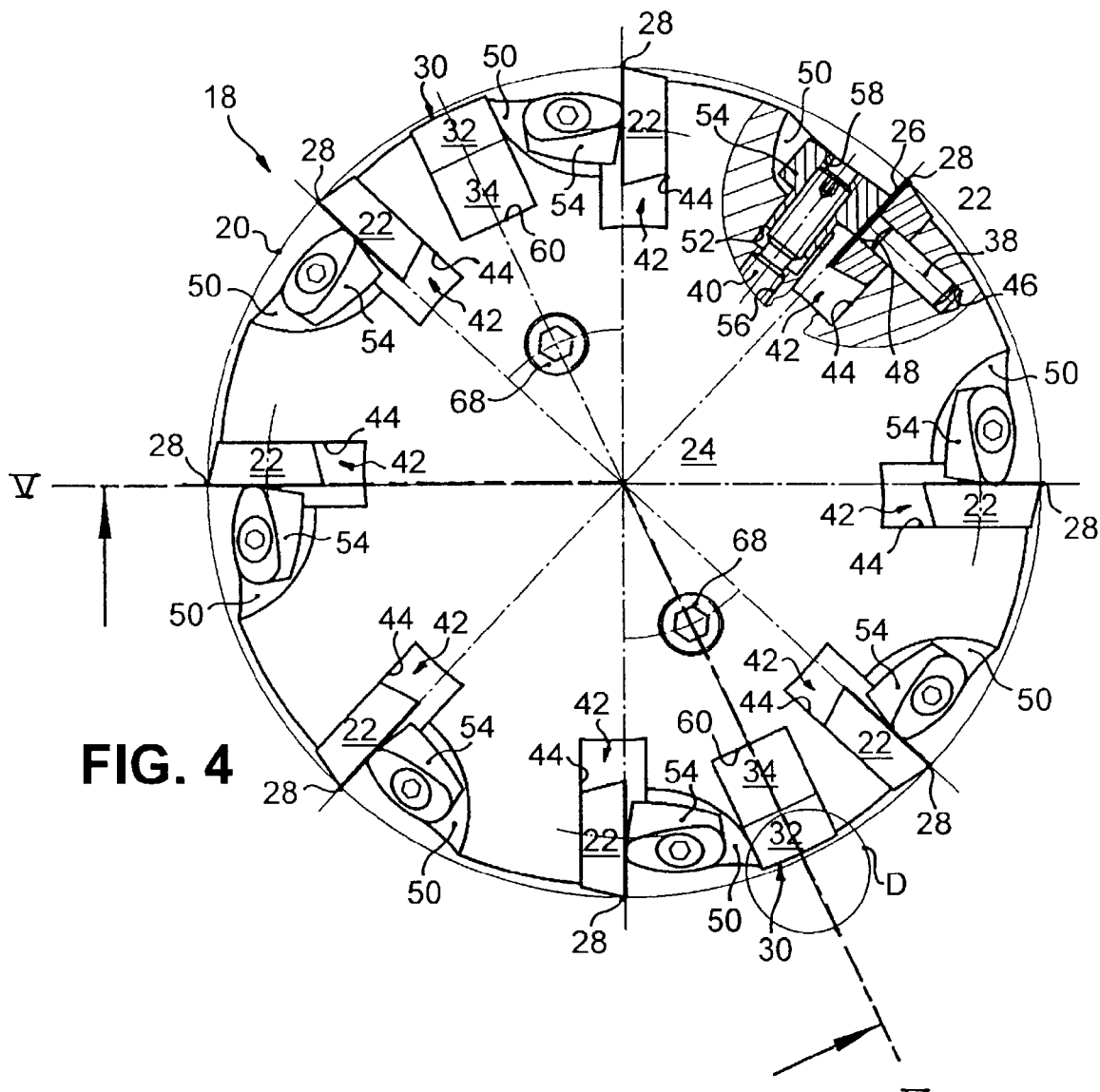
FIG. 4 shows a truncated front view of a tool according to the invention for the surface machining of plastic spectacle lenses, which in addition to a plurality of milling cutter tips distributed uniformly around the circumference also has two symmetrically arranged turning tools.
Figure 5:
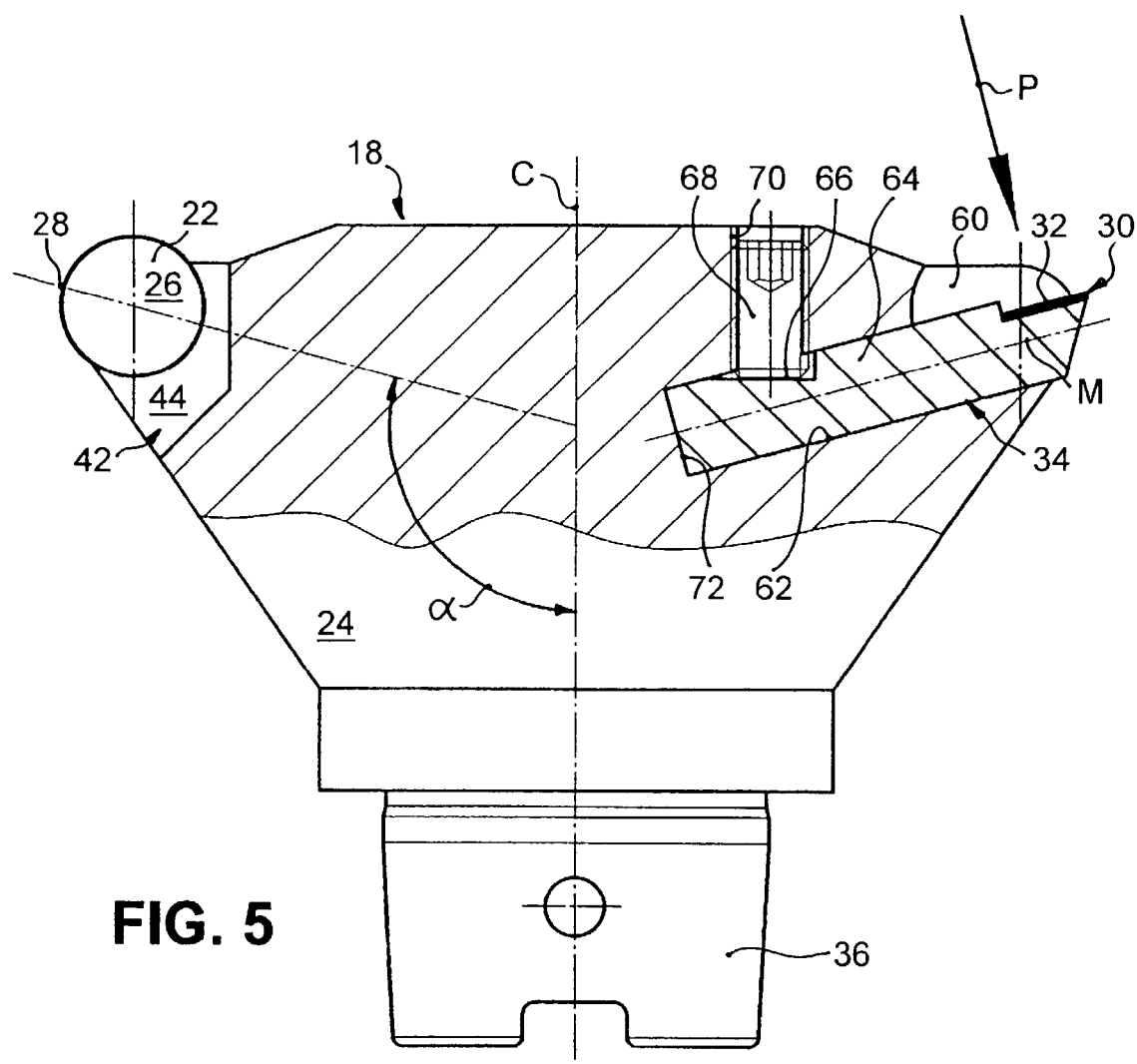
FIG. 5 shows a sectional view of the tool shown in FIG. 4 along the line of section V—V in FIG. 4, in which, in order to simplify the representation, only one of the milling cutter tips is shown.

A tool 18, designed so as to be suitable both for a milling operation and for a rotational machining operation, is represented in more detail in FIGS. 4 and 5. The tool 18, in the manner of a cutter head, has a plurality of milling cutter tips 22 (eight in the example of embodiment shown), uniformly distributed over the circumference of a tool body 24, the tips having a conical shape and each being provided at their larger diameter end with a coating 26 of PCD, for example, which viewed from above as in FIG. 5 forms an annular milling cutter edge 28. As the tool 18 rotates about the axis of tool rotation C, the milling cutter tips 28, in a plane perpendicular to the axis of tool rotation C, define the circular orbit 20 already mentioned, which in FIG. 4 is represented by a circular line and the diameter of which is greater than the largest diameter of the substantially tapered body 24.

Furthermore, at least one rotational cutting edge 30 is arranged on the body, the example of embodiment shown having two such rotational cutting edges 30 arranged opposite one another in relation to the axis of tool rotation C, these each being formed by a cutting tip 32 on a turning tool 34 detachably fixed to the body 24 and offset radially inwards by a predefined amount in relation to the circular orbit 20 of the milling cutter edges 28, as can be seen from FIG. 4. Given a diameter for the milling cutter edge circular orbit 20 of 80 mm, for example, the rotational cutting edges 30 are each offset radially inwards by approximately 0.2 mm towards the axis of tool rotation C or arranged at a distance of 39.8 mm from the axis of tool rotation C, so that in a milling operation they cannot come into engagement with the prescription surface R of the spectacle lens L to be machined. As can furthermore be seen from FIG. 5, the rotational cutting edge 30 lies essentially on a level with the circular orbit 20 of the milling cutter edges 28 in an imaginary plane parallel to a plane which runs perpendicular to a plane spanned by the axis of tool rotation C and the central axis M of the associated turning tool 34, and which contains the central axis M of the turning tool 34, whilst the milling cutter edges 28 each lie in a plane, which contains the tool axis of rotation C.

The fixing of the milling cutter tips 22 to the body 24 at its end remote from its mounting section 36, of a design known in the art, is represented in more detail by two openings at the top left-hand side in FIG. 4. Whilst that opening situated further to the right in FIG. 4 has been made in a plane lying parallel to the plane of projection, which contains the central axis of a pin 38 positioning the corresponding milling cutter tip 22 on the body 24, the left-hand opening in FIG. 4 lies in a plane, which actually runs at an angle to the plane of projection and contains the central axis of the threaded pin 40 shown, but in order to simplify the representation has been tilted into the plane of projection.

According to FIG. 4, in particular, the metal body 24 is provided with identical recesses 24, which are uniformly distributed over its outer circumference and which each have a plane surface 44 for extensive support of the respective milling cutter tip 22. The position of the plane surface 44 and the thickness of the respective milling cutter tip 22 are co-ordinated with one another in such a way that the milling cutter edge 28 of a milling cutter tip 22 placed on the plane surface 44 lies in one plane with the axis of tool rotation C or is aligned radially thereto. Formed in the plane surface 44 is a blind hole 46, into which the cylindrical pin 38 is pressed, so that one end of the metal pin 38 protrudes from the plane surface 44. The milling cutter tip 22, provided centrally with a bore 48, is mounted on the end of the pin 38 protruding from the plane surface 44. The bore 48 in the milling cutter tip 22 is finally covered, on that side of the milling cutter tip 22 remote from the plane surface 44, by the coating 26.

As can also be seen from FIG. 4, each of the recesses 42 also has an inclined wall section 50, into which a bore section 52 is introduced, which serves to guide a cylindrical extension of a strap 54. Adjoining the bore section 52 of the body 24 is a tapped section 56, the central axis of which runs as an extension of the central axis of the bore section 52 at an angle to the plane of the plane surface 44 of the recess 42. The strap 54 also has a tapped section 58 running over its entire length, with opposite thread lead to the tapped section 56 in the body 24. The threaded pin 40 screwed into the tapped sections 56, 58 is correspondingly provided, starting from its ends, with separate externally threaded sections having opposite leads, i.e. a right-hand thread and a left-hand thread.

It will be seen that by turning the threaded pin 40, provided with a hexagon socket for this purpose, the strap 54 can be moved radially inwards or outwards, the strap 54 being brought closer to the plane surface 44 or distanced from the plane surface 44 are a result of the angular adjustment of the central axis of the threaded pin 40. In this way the milling cutter tip 22 can be clamped or wedged against the plane surface 44 by means of the strap 54.

It should finally be mentioned with regard to the milling cutter tips 22 that, of the circumference of the milling cutter edge 28, only an angle of approximately 50°, i.e. only about one seventh of the cutting circumference is used in a milling operation. Once the first cutting sector has worn, therefore, the milling cutter tips 22 can still be turned six times into a new position.

According to FIG. 4, the turning tools 34 are arranged approximately symmetrically between the milling cutter edges 28 of adjacent milling cutter tips 22, viewed in the circumferential direction of the tool 18. At the same time, the body 24 has a recess 60 for each turning tool 34, from which recess a blind hole 62 is introduced into the body 40 for receiving a circular 64 of the turning tool 34, as shown in FIG. 5. The blind hole 62 runs radially, i.e. in the direction of the axis of tool rotation C, the central axis of the blind hole 62 enclosing a predefined angle, in the example of embodiment shown an angle of approximately 75°, with the axis of tool rotation C. As can also be seen from FIG. 5, the metal shank 64 of the turning tool 34 has an inclined recess 66 or an inclined countersink, on which a grub screw 68 provided with a hexagon socket bears, which is screwed into a tapped hole 70, introduced into the body 24 parallel to the axis of tool rotation C. It can be seen that the grub screw on the one hand detachably fixes the turning tool in the blind hole 62 in the body 24, and on the other holds the turning tool 34 right up against the base 72 of the blind hole 62.

Figure 6:
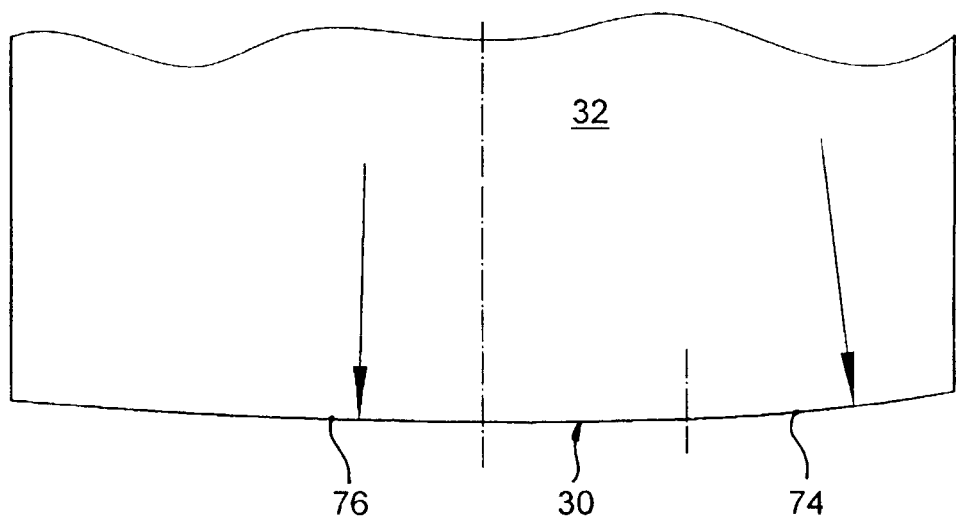
FIG. 6 shows an enlarged top view of the rotational cutting edge of a turning tool of the tool shown in FIGS. 4 and 5, according to the detailed section D in FIG. 4, viewed in the direction of the arrow P in FIG. 5.
Figure 7:
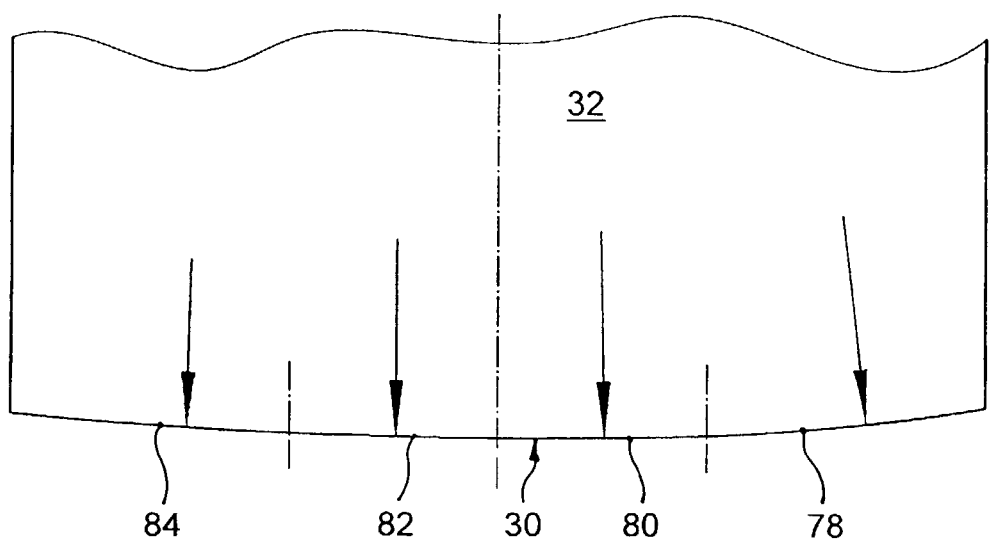
FIG. 7 shows an enlarged top view, as represented in FIG. 6, of the rotational cutting edge of a turning tool in an alternative development.

The cutting tip 32 either detachably fitted or applied as a coating to the turning tool 34 may, according to the particular requirements and specifically according to the material to be machined, be composed of polycrystalline diamond (PCD), natural diamond or also cemented carbide with or without anti-wear coating. In so far as the geometry of the rotational cutting edge 30 is concerned, FIGS. 6 and 7 show enlarged representations of two different variants of the rotational cutting edge 30, both of these already being developments of the simplest variant, according to which the rotational cutting edge 30 has a constant curvature over the entire cutting width. The curvature here preferably has a radius substantially equal to the distance of the rotational cutting edge 30 from the axis of tool rotation C, so that shape deflects, caused in the rotational machining due to an incorrect angular position of the rotational cutting edge 30 in relation to the prescription surface R of the spectacle lens L to be machined, are thereby avoided. With the aforementioned numerical values, this would here mean a radius of approximately 39.8 mm Common to the variants of the rotational cutting edge 30 represented in FIGS. 6 and 7 is the fact that the rotational cutting edge 30 has areas of differing, in each case constant curvature, the curvature viewed in the direction of rotation of the tool 18 diminishing, area by area, from one end of the rotational cutting edge 30 to the other end of the rotational cutting edge. Thus the rotational cutting edge 30 shown in FIG. 6 has two areas 74, 76, of which one area 76 serving as fining part has a constant radius of curvature with a radius, which as described above is essentially equal to the distance of the rotational cutting edge 30 from the axis of tool rotation C, whilst the other area 74 serving as a roughing part has a constant curvature with a radius, which is distinctly smaller than the radius of the first-aforementioned area 76, being 15 mm for example. In the example of embodiment shown, the width ratio between the areas 74 and 76 in a transverse direction of the cutting tip 32 is approximately 2 (area 74) to 5 (area 76).

In the case of the cutting tips 32 represented in FIG. 7, the rotational cutting edge 30 is even divided into four different area 78, 80, 82 and 84 of differing width, the curvature of which diminishes from right to left. The associated radii from right to left in FIG. 7 might be 40 mm, 80 mm, 120 mm and 200 mm, for example. The overall width of the rotational cutting edge 30 in the transverse direction of the cutting tip 32 can nevertheless remain less than 10 mm.

It will be appreciated from the description above that the geometry of the rotational cutting edge 30 can be selected within wide limits according to the geometry and the material of the workpieces to be machined and the machining methods to be performed, the facility for bringing different areas of the rotational cutting edge into machining engagement with the surface of the workpiece to be machined also being capable of increasing the overall life of the rotational cutting edge compared to the prior art.

For a fuller explanation of a preferred method sequence, reference will now be made to FIGS. 8 to 11, which are, however, only illustrative of a rotational machining operation. The rotational machining operation is preceded by a milling operation, the principle of which is described in DE 195 29 786 C1 of the applicant. This milling operation comprises at least one infeed operation, in which the tool 18 rotating at controlled speed about the axis of tool rotation C and the spectacle lens L rotating at controlled speed about the axis of work rotation B are moved in relation to one another, positionally controlled in at least one of the two axes X and Y, in such a way that the milling cutter edges 28 produce an annular trough-shaped recess at least in the area of the outer edge of the spectacle lens L, before the tool 18 in a forming operation is guided inwards along a controlled helical path over the spectacle lens L, in order to abrade further material. Optional, although preferred associated operations in the milling operation are the edging and the beveling of the spectacle lens L. In the edging, the spectacle lens blank is machined by means of the rotating tool 18 to the peripheral contour defined by the spectacle frame shape, for example, whilst in the beveling the upper or inner peripheral edge of the spectacle lens blank is bevelled by means of the rotating tool 18. These stages of the method will be sufficiently familiar to the person skilled in the art, so that these will not be explored further here.

For the rotational machining operation the rotation of the tool 18 is first stopped and the rotational cutting edge 30 of the tool 18 is then brought into a predetermined angular position by angularly controlled rotation of the tool 18 about the axis of tool rotation C. The rotational cutting edge 30 of the tool 18, consequently brought into a defined angular position, is now applied, through a positionally controlled relative movement of spectacle lens L and tool 18 in at least one of the two axes X and Y, tangentially to the prescription surface F of the spectacle lens L, turned with a controlled angle of rotation about the axis of work rotation B, in the area of the outer edge of the prescription surface F to be machined. This state is represented in FIG. 8. As already mentioned above in the description of the design of the tool 18, the facility fo swiveling the tool 18 with a controlled angle of rotation here allows a specific turning tool 34 having a cutting tip 32 composed of a specific material, or a specific area of the rotational cutting edge 30 having a specific curvature, to be applied to the prescription surface F of the spectacle lens L, according to the particular machining requirements. Any chip removal necessary for fining and to compensate for inaccuracies resulting from the milling is thereby adjustable.

The rotational cutting edge 30 is then guided over the spectacle lens L along a helical path, preferably similar in shape to that of an Archimedean spiral, by positionally controlled relative movement of spectacle lens L and tool 18 in the two axes X and Y and rotation of the tool 18 with a controlled angle of rotation about the axis of tool rotation C, as a function of the angle of rotation of the spectacle lens L about the axis of work rotation B. The spiral interval followed in this process is, on the one hand, smaller than the spiral interval of the helical path in the preceding milling operation, in order to keep the peak-to-valley height of the machined surface F within predetermined limits, but on the other is greater than in conventional rotational machining methods, owing to the relatively large radius of the rotational cutting edge 30, which also ensures a very low kinematic roughness of the surface F produced.

FIG. 9 illustrates in this context that in the rotational machining operation the position of the rotational cutting edge 30 is always adjusted to the respective curvature of the surface F though CNC rotation of the tool spindle 12, even when producing non-rotationally symmetrical surfaces (a toroidal surface F in the example shown), so that the rotational cutting edge 30 comes to bear tangentially on the surface F to be machined. This involves continuous CNC tracking of the rotational cutting edge 30. A comparison between FIGS. 9 and 8 furthermore shows that in the rotational machining operation, not only (a) is the rotational cutting edge 30 swiveled to and fro to a defined extent about the axis of tool rotation C as a function of the of the angle of rotation of the spectacle lens L, but also (b) that the spectacle lens L is moved to and fro to a defined extent in the axis Y, i.e. to right and left in FIG. 9, and (c) that the tool 18 is moved to and fro to a defined extent in the axis X, i.e. upwards and downwards in FIG. 9. Moreover, although in FIG. 9 the engagement area between the rotational cutting edge 30 and the surface F of the spectacle lens L to be machined is shown, as in FIG. 8, in immediate proximity to the edge of the spectacle lens L to be machined, in order to simplify the representation, in actual fact the engagement area has already migrated a short distance radially inwards due to guiding of the rotational cutting edge 30 along the helical path over the spectacle lens L.

FIGS. 10 and 11 finally illustrate the end of the rotational machining method. As soon as the rotational cutting edge 30 on its helical path over the spectacle lens L has reached the optical axis of the spectacle lens L, and the spectacle lens L has again been turned through 360°, the latter is moved away from the tool 18 in the Y axis, so that the rotational cutting edge 30 disengages from the spectacle lens L. The result of the rotational machining is a (fine) turned prescription surface F, extremely fine in respect of geometrical accuracy and peak-to-valley height and of a quality ready for polishing.

It will be evident to the person skilled in the art that sintered, disc-shaped grinding tools can also be used on the device described above for the machining of workpieces composed of brittle materials, such as mineral glasses or ceramic forms, as described for example in DE 195 29 786 C1 filed by the applicant with reference to FIGS. 3 and 4, since the aforementioned device with its four CNC axes X, Y, B and C can also perform all sequences of movements described in DE 195 29 786 C1. The device described is therefore suitable for the machining of all materials and surfaces, including prismatic surfaces and freeform surfaces in the so-called "RX" range, i.e. in the sphere of prescription spectacle lens machining. Use as a purely rotational machining device, in which the rotational cutting edge as described can also be swiveled in relation to the machined surface, is even conceivable.

Furthermore, it will be evident to the person skilled in the art that although a linear movement facility for the work spindle (Y axis) and a linear movement facility for the tool spindle (X axis) has been described above, the resulting relative movement between workpiece and tool can also be produced, according to the particular requirements, by providing two linear movement facilities (X and Y axis) for the work spindle or the tool spindle, by means of a cross slide arrangement for example, whilst the other spindle in either case has no linear movement facility.

A device for the surface machining of, among other things, plastic spectacle lenses is disclosed, which has a work spindle, by means of which the spectacle lens can be driven with a controlled angle of rotation about an axis of work rotation B, and a tool spindle, by means of which a tool can be driven to rotate about an axis of tool rotation C, work and tool spindle being movable relative to one another with their positions controlled in two axes X, Y running at right angles to one another. According to the invention, for rotational machining of the surface of the spectacle lens to be machined, the tool can also be swiveled by means of the tool spindle with a controlled angle of rotation about the axis of tool rotation C, so that a rotational cutting edge provided on the tool can be brought into a defined rotational machining engagement with the surface of the spectacle lens to be machined as a function of the angle of rotation of the spectacle lens. The invention also comprises a combined milling and rotational machining tool and a combined milling and rotational machining method. As a result, high cutting rates and very good surface qualities can be easily and efficiently achieved in the surface machining.

We claim:

1. A device for the surface machining of workpieces of non-brittle materials in optical lens manufacturing, the device having a work spindle, by means of which the workpiece can be driven to rotate with a controlled angle of rotation about an axis of work rotation, and a tool spindle, by means of which a tool can be driven to rotate about an axis of tool rotation, which encloses a predetermined angle with the axis of work rotation, the work spindle and the tool spindle being movable relative to one another with their positions controlled in two axes running at right angles; wherein for a rotational machining of the surface of the workpiece to be machined, the tool can be swiveled by means of the tool spindle with a controlled angle of rotation about the axis of tool rotation, so that a rotational cutting edge provided on the tool can be brought into a defined rotational machining engagement with the surface of the workpiece to be machined as a function of the angle of rotation of the workpiece.

2. A device according to claim 1, wherein both the work spindle and the tool spindle are aligned horizontally.

3. A tool for the surface machining of workpieces composed of non-brittle material in optical lens manufacturing, the tool having a body defining an axis of tool rotation, on which body a plurality of milling cutter edges are provided, which as the tool rotates about its axis of tool rotation define a circular orbit in a plane perpendicular to the axis of tool rotation, wherein at least one rotational cutting edge is also provided on the body, which is offset radially inwards by a predefined amount in relation to the circular orbit of the milling cutter edges, and wherein the rotational cutting edge has a constant curvature with a radius, which is substantially equal to the distance of the rotational cutting edge from the axis of tool rotation.

4. A tool according to claim 3, wherein multiple rotational cutting edges are provided on the body, which are distributed uniformly over the circumference of the body.

5. A tool according to claim 3, wherein the rotational cutting edge is formed by a cutting tip on a turning tool, which is detachably fixed to the body.

6. A tool according to claim 3, wherein the body is provided with a blind hole for receiving a shank of the turning tool which is circular in cross-section, the shank having an inclined recess, against which a screw that can be screwed into a tapped hole in the body bears in order to detachably fix the turning tool to the body and to hold it up against a base of the blind hole.

7. A tool for the surface machining of workpieces composed of non-brittle material in optical lens manufacturing, the tool having a body defining an axis of tool rotation, on which body a plurality of milling cutter edges are provided, which as the tool rotates about its axis of tool rotation define a circular orbit in a plane perpendicular to the axis of tool rotation, wherein at least one rotational cutting edge is also provided on the body, which is offset radially inwards by a predefined amount in relation to the circular orbit of the milling cutter edges, and wherein the rotational cutting edge has areas, of different, in each case constant curvature, of which one area has a constant curvature with a radius essentially equal to the distance of the rotational cutting edge from the axis of tool rotation.

8. A tool according to claim 7, wherein multiple cutting edges are provided on the body, which are distributed uniformly over the circumference of the body.

9. A tool according to claim 7, wherein the rotational cutting edge has areas, of different, in each case constant curvature, the curvature viewed in the direction of rotation of the tool diminishing continuously area by area from one end of the rotational cutting edge to the other end of the rotational cutting edge.

10. A tool according to claim 7, wherein the rotational cutting edge has two areas, of which one area has a constant curvature with a radius essentially equal to the distance of the rotational cutting edge from the axis of tool rotation, whilst the other area has a constant curvature with a radius that is distinctly smaller than the radius of the former area.

11. A tool according to claim 7, wherein the rotational cutting edge is formed by a cutting tip on a turning tool, which is detachably fixed to the body.

12. A tool according to claim 11, wherein the body is provided with a blind hole for receiving a shank of the turning tool which is circular in cross-section, the shank having an inclined recess, against which a screw than can be screwed into a tapped hole in the body bears in order to detachably fix the turning tool to the body and to hold it up against a base of the blind hole.

* * * * *